United States Patent [19]

Boaz

[11] 4,366,643
[45] Jan. 4, 1983

[54] INSECT TRAP

[76] Inventor: Virgil L. Boaz, Rte. 1 - Box 297, Vandalia, Ill. 62471

[21] Appl. No.: 211,315

[22] Filed: Nov. 28, 1980

[51] Int. Cl.³ .............................................. A01M 1/04
[52] U.S. Cl. ...................................................... 43/113
[58] Field of Search .................. 43/113, 131; 422/125; 239/34, 136

[56] References Cited

U.S. PATENT DOCUMENTS

| | | | |
|---|---|---|---|
| 1,601,552 | 9/1926 | Bell | 43/113 |
| 2,577,436 | 12/1951 | Smith | 43/113 |
| 2,731,762 | 1/1956 | Jones | 43/113 |
| 3,348,332 | 10/1967 | O'Connell et al. | 43/113 |
| 3,513,585 | 5/1970 | Ross | 43/113 |
| 4,086,720 | 5/1978 | Wiser | 43/113 |
| 4,086,721 | 5/1978 | Deas | 43/113 |
| 4,117,624 | 10/1978 | Phillips | 43/113 |
| 4,157,629 | 6/1979 | Parks | 43/113 |

Primary Examiner—Stephen G. Kunin
Assistant Examiner—K. Bradford Adolphson
Attorney, Agent, or Firm—Kalish & Gilster

[57] ABSTRACT

An insect trap suited for attracting and killing flying insects includes a fluorescent light for emitting light of frequency for attracting such insects. A fluid reservoir, in the form of a tray, is supported in cross proximity to the light and below it for entrapping and killing the insects, as by drowning, in oil or other fluid contained in the reservoir. The closely spaced relationship between light and reservoir causes insects attracted to the light likely to contact the fluid. A cover of the trap shields the light and tray from the elements and other contamination, as by leaves, dust, etc. A mounting arrangement of universal character effectively suspends the trap from a single point, being configured to allow angular orientation and tilting of the trap to maintain the fluid level within the tray.

2 Claims, 6 Drawing Figures

INSECT TRAP

BACKGROUND AND SUMMARY OF THE INVENTION

This invention relates to insect traps and, more particularly, to a simple, effective trap for attracting and killing flying insects.

It is an object of the present invention to provide an insect trap which employs light to attract insects to the trap for being killed.

It is a further object of the present invention to provide such an insect trap which causes drowning and/or poisoning of insects thus attracted.

Another object of the present invention is the provision of such an insect trap utilizing a tray or reservoir for fluid in which the insects are drowned or poisoned which is not only reliably secured to the trap but can be easily removed therefrom for cleaning, refilling, etc.

Another object of the invention is the provision of such an insect trap utilizing an absolute minimum of parts and components, and which is extremely simply, economically, and rapidly constructed and assembled.

A further object of the invention is the provision of such an insect trap which can be supported from a variety of different structures and, as supported, can be oriented precisely and easily for proper disposition of the liquid reservoir or tray.

Yet another object of the invention is the provision of such an insect trap which provides shielding and protection of the reservoir and various components of the trap from the elements and particularly rain or snow, etc., as well as from leaves, dust, and so forth, being thus particularly intended for outdoor use, as around farms, livestock operations, and the like.

A further object of the invention is the provision of such an insect trap which is extremely durable, reliable, and long-lasting in operation.

Other objects and features will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
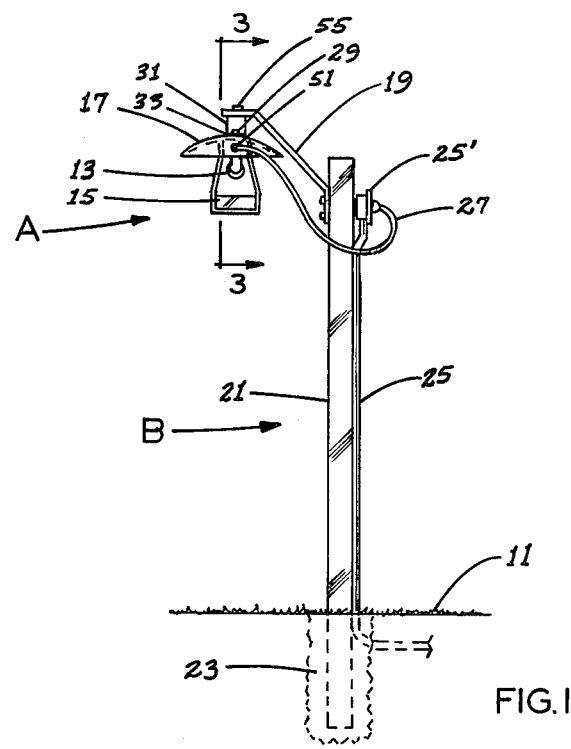
FIG. 1 is a side elevation view of an insect trap constructed in accordance with and embodying the present invention.
Figure 2:
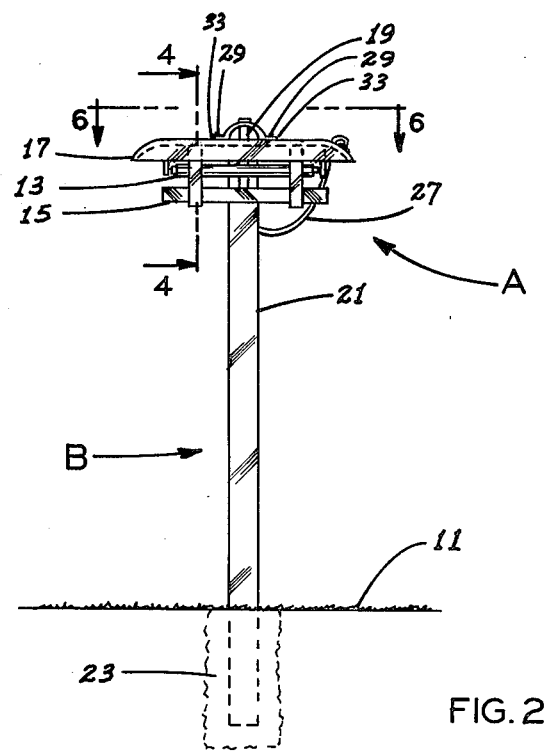
FIG. 2 is a front elevation view of the new insect trap showing, as in FIG. 1, the insect trap pole-mounted for use.

Referring now to the drawings by reference characters, illustrated generally at A is a new insect trap of the invention, as secured and mounted by a pole support B with said trap A being positioned at a height above ground level 11 suitable for attracting insects to the trap for being killed.

More specifically, trap A comprises a light source constituted by a fluorescent bulb or lamp 13 which may emit ultraviolet, white, or other light of colors either within or beyond the visible spectrum suitable for the attraction of insects to trap A. Generally speaking, there is located below bulb 13 a rectangular tray or reservoir 15 in close proximity to the bulb and adapted for carrying a quantity of liquid described below, for capturing and killing the insects which are attracted to the trap and which fly in the vicinity of the bulb.

A cover 17 extends over bulb 13 and tray 15 to shield the elements of the trap and pan 13 from rain, snow, or other precipitation, as well as from dust, leaves, etc. Said cover 17 provides support for tray 15 and is in turn supported or suspended by a bracket 19 secured to a suitable pole 21 of wood or other appropriate material. Its lower end is embedded in the ground, as indicated at 23, to position tray A a distance of several feet above ground level.

Electrical power, e.g., at 110-115 v.a.c., is supplied to tray A for energizing bulb 13 by a power cable extending through a conduit 23 which is secured to the pole and terminates at a receptacle 25 into which is plugged a flexible power cord 27 interconnected, as demonstrated below, with a fixture for bulb 13.

Figure 3:
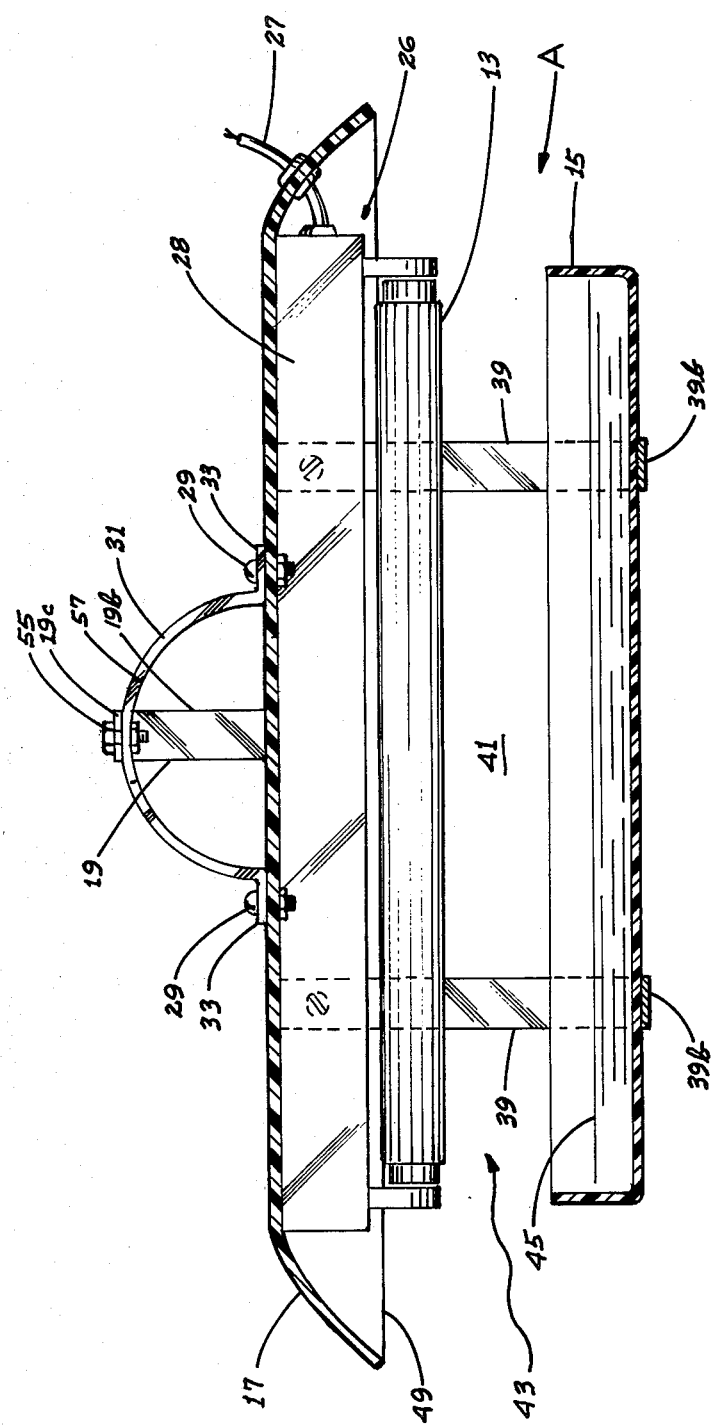
FIG. 3 is a longitudinal cross section of the trap, taken generally along line 3—3 of FIG. 1.
Figure 4:
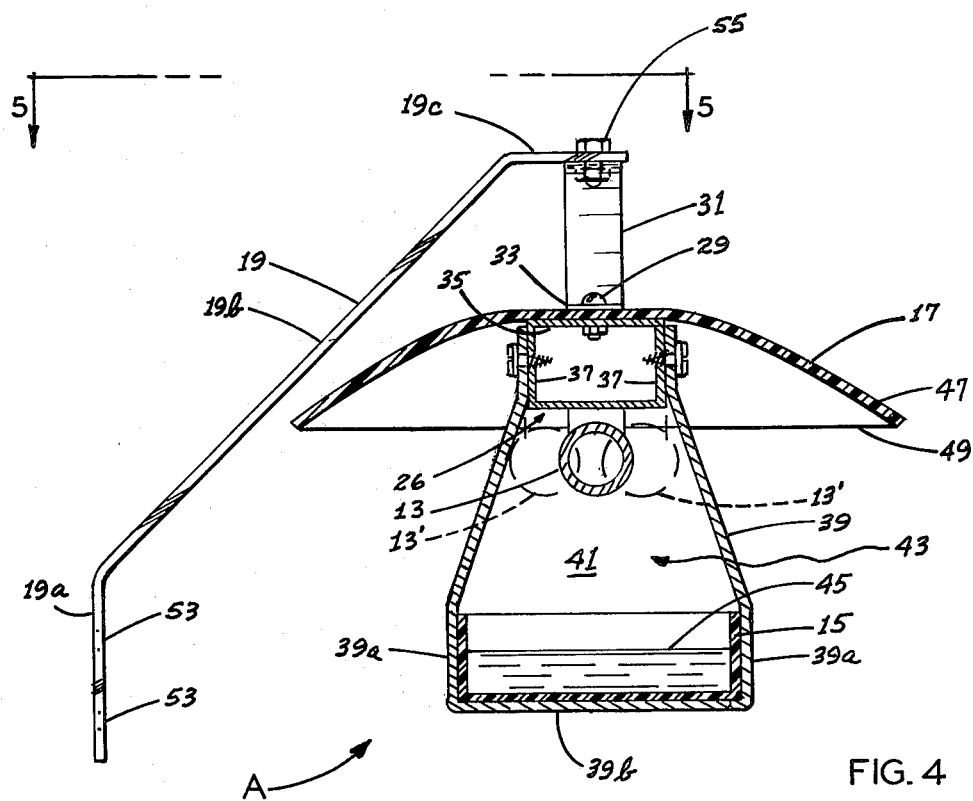
FIG. 4 is a transverse cross section of the trap taken along line 4—4 of FIG. 2.
Figure 5:
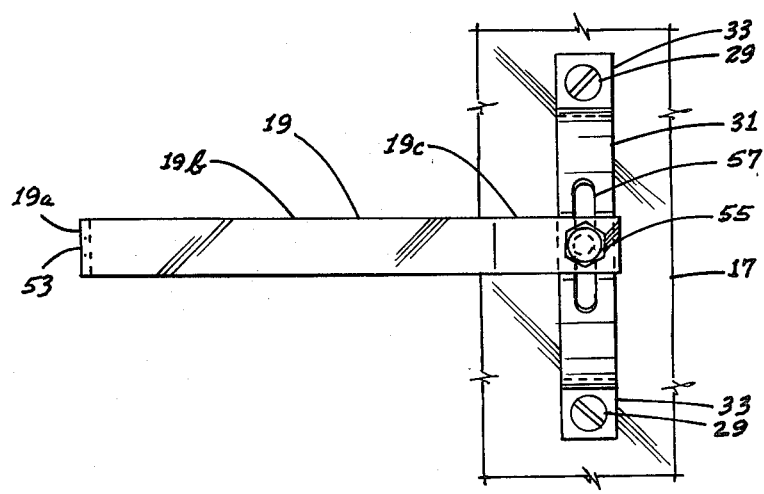
FIG. 5 is a top plan view of certain support structure of the new trap.

Referring now to FIGS. 3-5, bulb 13 is carried by a fluorescent fixture, generally designated at 25, of a conventional type which includes a metal housing 27 secured, as shown in FIG. 4, by bolts 29 to a substantially handle-shaped arcuate bracket fixture 31 oriented in the configuration of an inverted "U" and having outwardly extending end portions 33 which receive said bolts 29. Cover 17 is clampingly secured between the bracket end portions 33 and the upper surface 35 of housing 27.

Extending from the side walls 37 of fixture 25 are a pair of supports or hangers of strap-like character, as designated at 39. As shown in FIG. 4, these supports each define an opening of cross section tightly receiving tray 15. For this purpose, supports 39 have vertical portions 39a and horizontal portions 39b providing for securement of tray 15 centered laterally beneath the bulb 13. The tray has a width substantially greater than that of fixture 25 and a length substantially greater than bulb 13. Supports 39 are preferably of easily formable metal, such as galvanized steel, aluminum, or the like whereby they may be precisely shaped for gripping engagement with tray 15.

The preferred spacing between the upper edge of tray 15 and a bulb 13 is preferably on the order of a few inches providing a rather closely confined region 41 into which insects are compelled to fly by attraction to the light emanating from bulb 13. Representative paths of insects so attracted is are shown by arrows such as designated at 43. Tray 15 is filled, as shown at 45, with a quantity of liquid having a propensity for trapping and killing the insects which inadvertently contact such fluid or, in the course of striking bulb 13 fall into such fluid. Preferably, the tray is filled to a level as indicated. Such fluid may preferably be one of a variety of oils of various possible viscosities such as exemplified by used motor oil for cars, trucks, and agricultural vehicles which is not excessively prone to vaporizing and is sufficiently viscous to be retained in tray 15 without much sloshing or chance for spilling even if tray A should be caused to vibrate or sway in the wind. Additionally, or alternatively, fluid 45 may be one of various commonly available insecticides which will rapidly and effectively kill insects which contact it or come in close proximity thereto. Further, various insect attracting scents can be introduced in said fluid 45 for increasing the attraction and causing insects to be more closely drawn to the surface of such fluid where, upon contact, they will become wetted, trapped, and drowned. To this end, various wetting agents or other surfactants may be added to said fluid.

Figure 6:
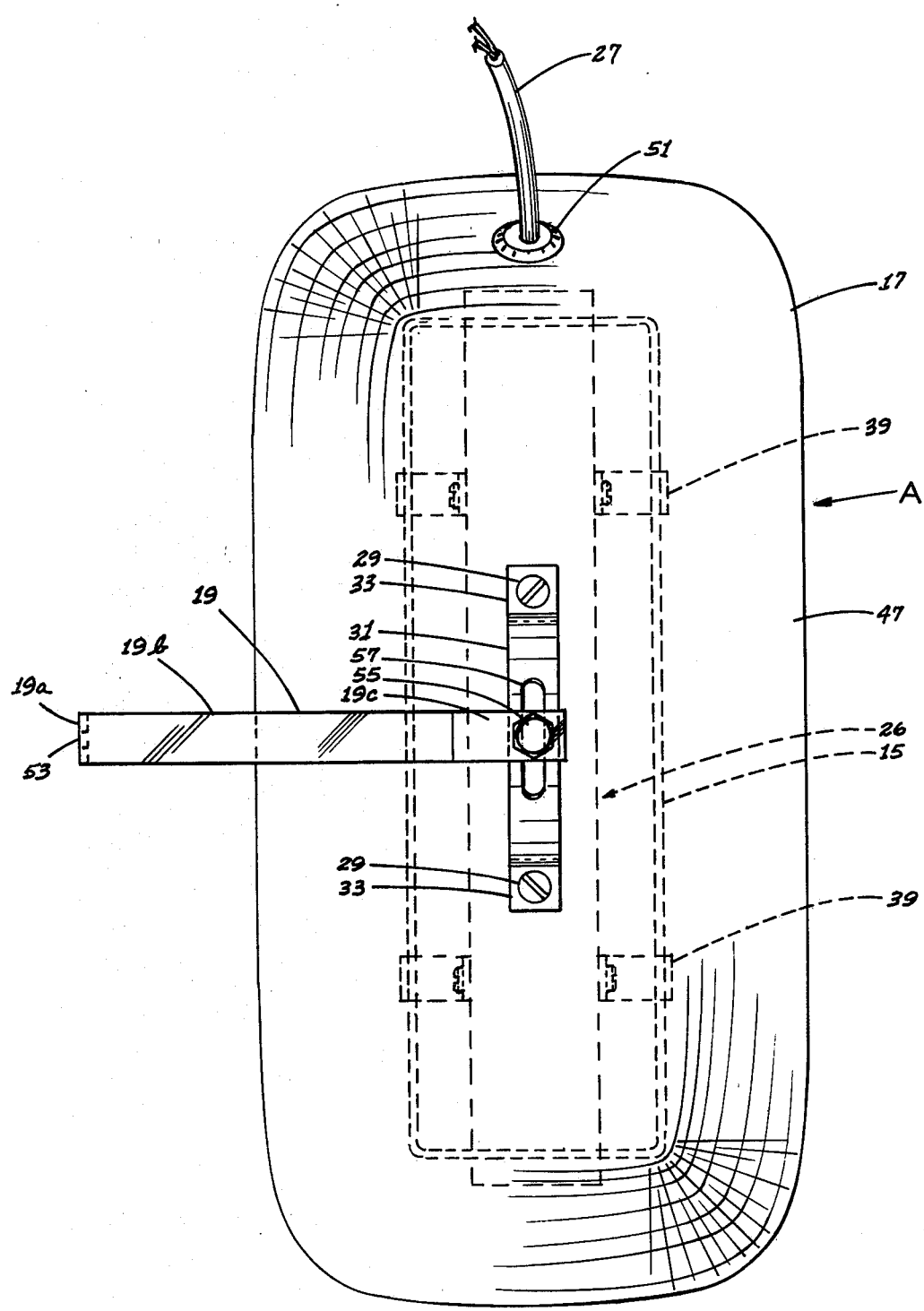
FIG. 6 is a top plan view of the new trap.

Cover 17 is preferably of the shape, as shown in plan view in FIG. 6, which approximates an elongated form of an ellipse. The cover is of an inverted disk-like character having a downwardly turned edge 47 extending around its entire periphery so that light fixture 25 is entirely shielded within said cover and with the lower edge 49 of the fixture housing 27 being located above the peripheral edge 49 of cover 17. As is apparent, the cover is of sufficient width and length to extend well beyond the sides and ends of tray 15 whereby precipitation, as in the form of rain or snow, as well as falling leaves, dust, or other falling matter will be substantially precluded from entering tray 15 and thus raising the level of fluid 45 or diluting same.

Power cord 19 is shown to extend through one end of cover 17, being forced through a grommet 51 for reliably keeping moisture from running down power cord 19 into light fixture housing 27.

Both tray 15 and cover 17 may each be preferably constructed of pre-molded plastic material of a resilient nature and advantageously may be formed of various injection molded thermoplastics such as polystyrene, polyethylene, polypropylene, polycarbonate, nylon, polychlorotrifluoroethylene, polytetrafluorethylene and ABS (acrilo-butadiene-styrene) and various other polymers and copolymers, etc. or may be molded in other manners using various thermosetting plastics constituted of suitable synthetic resin materials.

In accordance with the invention, trap A is supported by bracket 19 which is configured to provide what may be termed a so-called universal mount. For this purpose, bracket 19 has a vertical portion 19a having holes drilled therein, as at 53, for securement to post 21 or any other suitable upright support structure. Said portion 19a integrally joins a sloped or central diagonal portion 19b which in turn joins a horizontal portion 19c having a hole in its outer extremity for receiving a bolt 55 or other securement device for attaching bracket 19 to bracket fixture 31. Portion 19c may be adjusted to provide a more or less horizontal orientation of tray 15 by bending of the sloping center portion 19b of the bracket.

Fixture 31 is provided with an elongated slot 57 providing a arcuate extent through which the securement of fixture 31 may be affixed to bracket portion 19c. This provides for the orientation of trap A so that tray 15 is in a substantially horizontal condition for proper levelling of fluid 45 therein. Thus, it will be apparent that if post 21, for example, is not perfectly vertically aligned, bracket 19 may be bent or fixture 31 may be oriented by movement relative to bolt 55, within the range permitted by slot 57, to properly orient the trap to level the fluid 45 within tray 15.

Although a single bulb 13 is shown supported from fixture 25, a trap of the invention may utilize two bulbs, as shown in phantom at 13', or more. Other bulb arrangements, including incandescent types, may alternatively be employed.

During operation, insects which are drawn to lamp or bulb 13 are killed by poisoning or drowning in fluid 45. A quantity of dead insects will thus tend to be accumulated in tray 15 over several days. By virtue of the orientation of the supports 39, the side portions 39a may be sprung apart slightly to allow tray 15 to be easily slidably withdrawn for emptying and refilling with fluid 45, and just as easily replaced.

In view of the foregoing, it will be seen that the various objects of the invention and other advantageous results are obtained.

Although the foregoing includes a description of the best mode contemplated for carrying out the invention, various changes and modifications are contemplated.

It should be understood that changes and modifications in the formation, construction, arrangement, and combination of the various parts of the insect trap of this invention may be made and substituted for those herein shown and described without departing from the nature and principle of this invention. The description, accordingly, shall be interpreted as illustrative rather than limiting.

What is claimed is:

1. An insect trap for attracting and killing flying insects comprising light-emitting means for emitting light of a frequency for attracting flying insects thereto, a fluid reservoir containing a quantity of fluid for entrapping and killing insects, structural support means for maintaining said light-emitting means and fluid-containing reservoir in closely spaced relationship for causing insects attracted to said lights to come into contact with said fluid, and universal mounting means for mounting said trap in a location for attracting insects and for permitting orientation of said trap for levelling of the fluid within said reservoir, said emitting means being constituted by at least one fluorescent bulb in substantially horizontal disposition, said fluid reservoir being constituted by a tray below said bulb and having dimensions extending beyond the length and width of said bulb, a cover extending across and beyond said lamp and said tray for preventing precipitation or other falling matter from entering said tray, said trap including a fluorescent lamp fixture for said lamp including a housing, said structural support means comprising at least two strap-like hangers secured to said housing and extending therebelow, each of said hangers defining an opening of cross section for tightly receiving said tray, and centering said tray beneath said lamp, said hangers permitting said tray to be withdrawn for cleaning, refilling, and replacement, said universal mounting means comprising a mounting fixture secured to said lamp fixture housing, said cover being clampingly secured between portions of said fixture and said housing, said fixture being of arcuate form in the shape of "U" extending above said cover and having an elongated slot therein for receiving a mounting bolt or the like, said slot permitting angular orientation of said trap for levelling of the fluid within said tray.

2. An insect trap according to claim 1 and further characterized by said hangers grippingly engaging said tray, and each having portions adapted to be sprung apart for allowing said tray to be withdrawn and replaced.

* * * * *